(12) United States Patent
Asamoto (10) Patent No.: US 9,009,403 B2
(45) Date of Patent: *Apr. 14, 2015

(54) MULTI-UPDATABLE LEAST RECENTLY USED MECHANISM

(71) Applicant: International Business Machines Corporation, Armonk, NY (US)

(72) Inventor: Noriaki Asamoto, Kusatsu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,771

(22) Filed: Dec. 2, 2013

(65) Prior Publication Data

US 2014/0089578 A1 Mar. 27, 2014

Related U.S. Application Data

(63) Continuation of application No. 13/560,473, filed on Jul. 27, 2012.

(51) Int. Cl.
*G06F 17/30* (2006.01)
*G06F 12/12* (2006.01)
*G06F 12/08* (2006.01)

(52) U.S. Cl.
CPC ........ *G06F 12/122* (2013.01); *G06F 17/30982* (2013.01); *G06F 12/0871* (2013.01)

(58) Field of Classification Search
CPC .............. G06F 12/1027; G06F 12/123; G06F 12/0864; G06F 2201/81; G06F 2201/88; G06F 2201/885; G06F 13/1631; G06F 13/1673; G06F 12/0875; G06F 12/3808; G06F 12/112; G06F 17/30982; G06F 12/1054; G06F 2212/45; G06F 17/30985; G06F 17/30979; G06F 2207/025; G06F 7/02; G06F 12/023; G06F 17/30; G06F 17/30023; G06F 17/30495
USPC ................................................. 711/108, 160
See application file for complete search history.

(56) References Cited

U.S. PATENT DOCUMENTS 6,125,433 A * 9/2000 Horstmann et al. .......... 711/160
6,141,731 A * 10/2000 Beardsley et al. ............ 711/160
(Continued)

FOREIGN PATENT DOCUMENTS

JP 06-089590 A 3/1994
JP 06-161898 A 6/1994
(Continued)

OTHER PUBLICATIONS

"Cache algorithms" [online], retrieved on Jul. 26, 2012 from the Internet URL: http://en.wikipedia.org/wiki/Least_recently_used.
(Continued)

*Primary Examiner* — Hashem Farrokh
(74) *Attorney, Agent, or Firm* — Thomas E. Tyson; Jack V. Musgrove (57) ABSTRACT

A control unit of a least recently used (LRU) mechanism for a ternary content addressable memory (TCAM) stores counts indicating a time sequence with resources in entries of the TCAM. The control unit receives an access request with a mask defining related resources. The TCAM is searched to find partial matches based on the mask. The control unit increases the counts for entries corresponding to partial matches, preserving an order of the counts. If the control unit also finds an exact match, its count is updated to be greater than the other increased counts. After each access request, the control unit searches the TCAM to find the entry having the lowest count, and writes the resource of that entry to an LRU register. In this manner, the system software can instantly identify the LRU entry by reading the value in the LRU register.

11 Claims, 4 Drawing Sheets

(56) References Cited

U.S. PATENT DOCUMENTS

| | | | |
|---|---|---|---|
| 7,246,197 B2* | 7/2007 | Rosenbluth et al. | 711/108 |
| 7,783,654 B1* | 8/2010 | Sreenath | 707/758 |
| 2004/0083299 A1* | 4/2004 | Dietz et al. | 709/230 |
| 2006/0080498 A1* | 4/2006 | Shoham et al. | 711/108 |

FOREIGN PATENT DOCUMENTS

| | | |
|---|---|---|
| JP | 09-034791 A | 2/1997 |
| JP | 10-162013 A | 6/1998 |
| JP | 2004-133934 A | 4/2004 |
| JP | 2005-196303 A | 7/2005 |
| JP | 2006-221611 A | 8/2006 |
| WO | 9215933 A1 | 9/1992 |

OTHER PUBLICATIONS

"Content-addressable memory" [online], retrieved on Jul. 11, 2012 from the Internet URL: http://en.wikipedia.org/wiki/Content-addressable_memory.

"Content-Addressable Memory Introduction" [online], retrieved on Jul. 11, 2012 from the Internet URL: http://www.pagiamtzis.com/cam/camintro.html.

"Page replacement algorithm" [online], retrieved on Jul. 11, 2012 from the Internet URL: http://en.wikipedia.org/wiki/Page_replacement_algorithm.

* cited by examiner

MULTI-UPDATABLE LEAST RECENTLY USED MECHANISM

CROSS-REFERENCE TO RELATED APPLICATION

This application is a continuation of copending U.S. patent application Ser. No. 13/560,473 filed Jul. 27, 2012.

BACKGROUND OF THE INVENTION

1. Field of the Invention

The present invention generally relates to data processing systems, and more particularly to a method of allocating resources in a data array such as a cache memory.

2. Description of the Related Art

Computer systems employ a variety of optimization techniques to more efficiently utilize data resources. For example, data arrays such as cache memory use special allocation methods to temporarily store data in a limited number of entries. When all of the entries in a cache memory are full (i.e., there are no unused or available entries), and the cache system receives a request to store a new data value, it must decide which of the old data values already stored in the cache memory must be replaced (overwritten). This allocation process is known as eviction.

The eviction process applies to many other types of resources and systems, but cache memories in particular are very useful for understanding general eviction-related concepts. Cache memories generally fall into one of three types: set associative, fully associative, or direct mapped. In a set associative cache, the cache entries are divided into groups referred to as sets. A set is the collection of cache entries that a given memory block can reside in, according to preset mapping functions. The number of entries in a set is referred to as the associativity of the cache, e.g., a 2-way set associative cache means that, for any given memory block, there are two blocks in the cache that the memory block can be mapped into; however, several different blocks in main memory can be mapped to any given set. A 1-way set associative cache is direct mapped, that is, there is only one cache block that can contain a particular memory block. A cache is said to be fully associative if a memory block can occupy any cache entry, i.e., there is one set, and the address tag for the cache entry is the full address of the memory block.

Fully associative cache memories often consist of a content addressable memory (CAM) storing the memory addresses and a random-access memory (RAM) storing the memory values, that is, operand data or program instructions. CAMs typically consist of rows and columns of memory cells generally similar to RAM cells providing read and write functions but additional circuitry is provided to permit matching. During a search operation an input to the CAM represents a memory address and the CAM compares the input with the addresses held in the CAM to see whether or not a match occurs. When a match is found an output signal is provided to a corresponding location in the data RAM so that a read or write operation may take place with the corresponding location in the data RAM of the cache. The cells of the CAM are arranged so that each row of cells holds a memory address, and each row of cells is connected by a match line to a corresponding word line of the data RAM to enable access of that word line when a match occurs on that match line.

When all of the entries in a given set are full and the cache receives a request, whether a read operation or a write operation, to a memory location that maps into the full set, the cache must evict one of the blocks currently in that set. While an entry can simply be randomly selected for eviction, this approach leads to inefficient cache usage, so system designers typically employ more sophisticated techniques to optimize the eviction process. One common technique having many variations is generally referred to as "least recently used," or LRU. LRU algorithms proceed on the assumption that the oldest entry in the cache or other data array is the entry which most likely will not be used in the near future by the particular program running at that time. Once the system identifies the entry in the set which is the least recently used, it allocates this region for the new store operation.

SUMMARY OF THE INVENTION

In the illustrative implementation of the present invention, a plurality of resource values are stored in entries of a ternary content addressable memory (TCAM) with respective count values indicating a time sequence in which the resource values were stored. A control unit receives an access request for a resource value which includes a mask value defining a relationship between certain resource values stored in the entries. The entries are searched to find matches with the resource value being accessed based on the mask value, the matches including one or more partial matches, i.e., not an exact match with the resource value being accessed. The control unit increases the count values for all entries corresponding to the partial matches, preferably preserving an order of the count values. If the control unit also finds an exact match, the count value for the corresponding entry is updated to be greater than the increased count values of the entries corresponding to the partial matches. After each access request, the control unit searches the TCAM to find the entry having a lowest count value, and writes the resource value of that entry to a least recently used (LRU) register. In this manner, when it becomes necessary to evict an entry for allocating a new resource value, the system software can instantly identify the LRU entry by reading the value in the LRU register.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Least recently used (LRU) algorithms can be very useful in optimizing resource allocation, but the software burden of managing information for identifying a specific region that has not been recently used and performing search processing is considerably heavy, particularly for devices such as caches having a large associativity. General implementations of this technique require keeping age bits for cache lines, and tracking the oldest cache line based on the age bits. In such an implementation, every time a cache line is used, the age of all other cache lines must be updated (a huge task for a large, fully associative cache), and then the software must examine the age bit of each cache line to determine which is actually the lowest (also a slow process for a large cache).

Because of the these limitations with LRU implementation, high-speed devices (e.g., cache memory) typically do not use a strict LRU protocol but rather employ a pseudo-LRU mechanism. While the pseudo-LRU algorithm is fast, it is not as efficient in theory as a "perfect" LRU algorithm which discards only the item that truly was the least recently used.

Another problem with LRU methods, including pseudo-LRU, is that the LRU mechanism cannot recognize related resources, so a resource is often evicted as being the oldest when it actually should be retained because a related resource was used very recently. For example, two memory addresses A and B of a program may be highly related to each other such that the chances are very high that memory address B will be accessed soon if memory address A has been accessed (and vice-versa). In such a case, memory address B may be released from a cache memory immediately accessing memory address A, leading to inefficient usage of the cache.

In light of the foregoing, it would be desirable to devise an improved eviction method which could retain the efficiency of a perfect LRU algorithm but without the associated software latencies. It would be further advantageous if the method could allow updating of multiple resources when a related resource is accessed. The present invention achieves these objectives using hardware to manage LRU values and immediately search for the least recently used resource at high speed. The invention also allows multi-updating of LRU values for related resources by using a ternary content addressable memory (TCAM) for the data array.

Figure 1A:
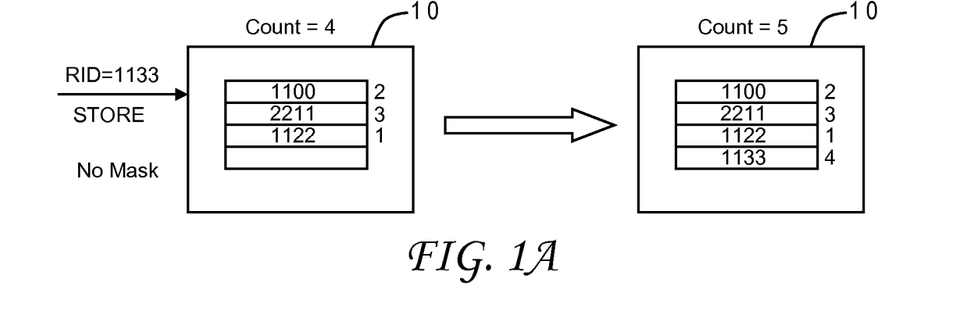
FIGS. 1A through 1C are pictorial representations of cache operations in a conceptual example for an LRU updating mechanism in accordance with one implementation of the present invention.
Figure 1B:
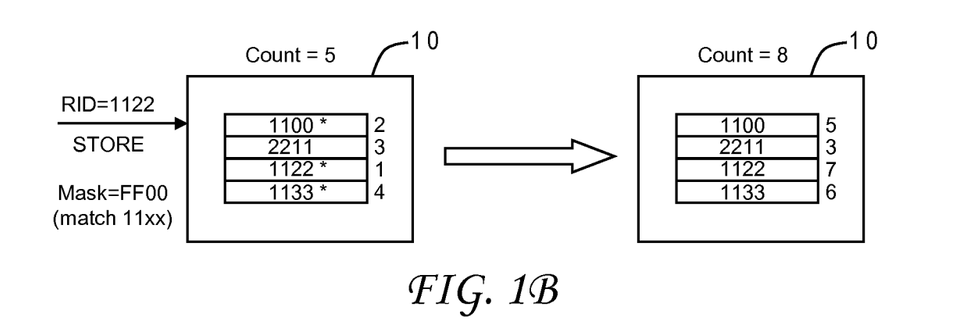
Figure 1C:
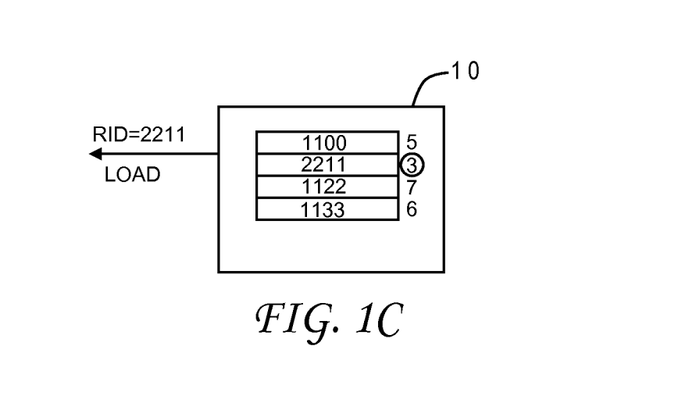

With reference now to the figures, and in particular with reference to FIGS. 1A-1C, there is depicted a high-level example of an LRU updating mechanism in accordance with one implementation of the present invention. In this example the resources involved are memory handles to manage memory resources stored in a TCAM 10 and shown in hexadecimal format, with respective count values indicating a time sequence (registration) in which the resources were stored. TCAM 10 has four entries, and as seen in FIG. 1A three different resource identifiers (RIDs) have been stored in previous operations. Memory handle "1122" was stored first, and has been assigned a count value of 1; memory handle "1100" was stored second, and has been assigned a count value of 2; memory handle "2211" was stored third, and has been assigned a count value of 3. Accordingly, the current count value (to be assigned to the next store operation) is 4. A store operation is received to store memory handle "1133". Since this memory handle is not already in TCAM 10, it is stored in the available entry and assigned the current count value of 4, and the count is increased to 5.

In FIG. 1B when the count is 5, another store operation is received, this time to store memory handle "1122". This store operation includes a mask value which is used to enable LRU updates for related resources; the relation of the resources is defined by the mask value. In this example the mask value is set for this particular store operation to "FF00". The mask value acts as a filter for the searching carried out against entries in TCAM 10. Conventional caches use regular (binary) CAMs which allow data search words consisting only of 1s and 0s. Ternary CAMs allow a third matching state of "x" (don't care) for one or more bits in the stored data word, thus adding flexibility to the search. The added search flexibility comes at an additional cost over binary CAMs since the internal memory cell must now encode three possible states instead of just two, but as integrated circuit sizes continue to shrink, it becomes more feasible to use larger data array structures.

The mask value of "FF00" (binary 1111111100000000) instructs TCAM 10 to return any matches based on only the first eight (most significant) bits of the input value. In other words, the last eight (least significant) bits of the TCAM entries are not considered when looking for a match. For the input store value of "1122" this corresponds to a search for "11xx" where "x" indicates a match with either a 1 or 0. For the state shown in FIG. 1B, TCAM 10 will return three matches, for memory handles "1100", "1122" (an exact match), and "1133". As explained further below, the control hardware for TCAM 10 can then update the LRU values for all three of these matches. With the current count of 5, the hardware will assign counts of 5, 6 and 7 to the three matches. The greatest count value (representing the youngest registration) is preferably assigned to the exact match, so the count value for memory handle "1122" becomes 7. The two remaining counts of 5 and 6 are assigned to the other two (partial) matches. Since memory handle "1100" is older than memory handle "1133" (a count of 2 versus 4), the older count of 5 is assigned to memory handle "1100" while the count of 6 is assigned to memory handle "1133". In this manner, all related resources are updated to indicate that they are more recent than unrelated resources, and the (temporal) order of the count values for partial matches is preserved.

Notably, the LRU values (counts) for any non-matching entries are not updated. In this example, the memory handle "2211" keeps its count value of 3. The LRU control hardware can then immediately search the counts (after each store or clear operation) to determine which entry has the lowest count. For FIG. 1C, this entry corresponds to memory handle "2211" since the count value of 3 is still the lowest. The hardware can then write this memory handle to a special register used to designate which entry is currently considered as the least recently used.

This implementation provides two distinct benefits. First, the LRU mechanism is a perfect LRU but since it is attained through high speed hardware it can be used even in systems having very large data arrays (there is no excessive load on the software). Since the target of LRU is automatically updated at the time of data writing, an LRU result will be returned immediately when software requires an eviction. This first benefit can be obtained even without a TCAM (e.g., using just a binary CAM). Secondly, this LRU mechanism makes it possible to easily perform update processing for all related resources concurrently, so the situation is avoided where a resource is discarded even though a related resource was just accessed. This second benefit can likewise be obtained even without using the immediate hardware LRU updating; for example, multi-updating could be implemented with a pseudo-LRU algorithm. These two benefits lead to significantly increased efficiency in the allocation of data resources.

Figure 2:
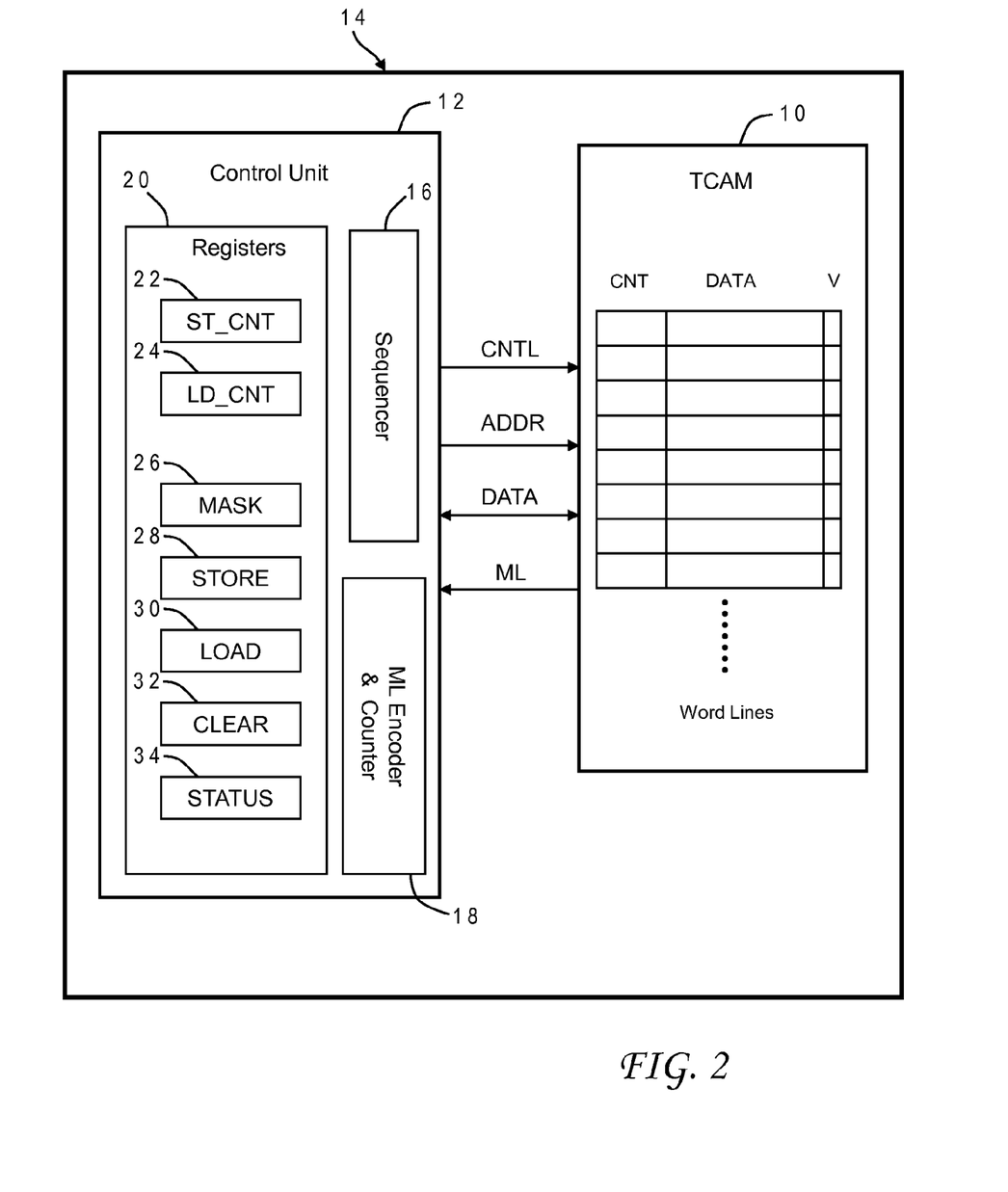
FIG. 2 is a block diagram of an LRU control unit for a data array which comprises a ternary content addressable memory (TCAM) according to the illustrative embodiment of the present invention.

A more specific implementation for TCAM 10 and its associated control unit 12 as contemplated by the present invention is seen in FIG. 2. TCAM 10 and control unit 12 may be part of a larger data system 14, such as a cache memory, having other components not depicted. Each word line of TCAM 10 is made up of twenty-five bits, including a count field (CNT) of eight bits, a data field (DATA) of sixteen bits, and a valid field (V) of one bit. The count field is the counter value indicating when the resource was used, i.e., if it has been used recently or not (temporal usage information). The counter value is updated at the time of writing in a STORE register or CLEAR register as described later. The smaller the value, the older the resource; however, it indicates the wrapping of the value (an overflow of the counter) if the value is smaller than a value in another register LD_CNT also described later. A value in the count field is referred to herein as an LRU value. The data field stores the values that are the subject of the TCAM, i.e., RIDs such as memory handles, file handles, and the like. The valid bit indicates whether the entry is valid or not. If this bit is 0, it indicates that the word line is invalid. Additional validity bits may be used for expanded coherency operations.

Control unit 12 includes a sequencer 16 that performs the basic operations for TCAM 10, a match circuit 18 for counting the number of matching bits (ML) and identifying an address, and various registers 20. Control unit 12 communicates with TCAM 10 using four types of signal lines, including control lines (CNTL), read/write address lines (ADDR), data lines (DATA), and match lines (ML). The application of each register is as follows. The ST_CNT register 22 holds the current count value, that is, the reference value of an LRU that is to be set at the time of the next STORE operation or CLEAR operation. The LD_CNT register 24 holds the LRU value of the entry which has been identified as the least recently used. The MASK register 26 is used for designating the "don't care" bits when searching TCAM 10 for related resources. If a mask bit is zero, it indicates the "don't care" state. The mask is user-defined depending on the program, and applies only to the data portion of the TCAM word line. For example, if an RID is a memory handle to manage a memory resource of a computer system, the operating system (software) can assign any number as an RID for each memory fraction and can group them using any mask bits. The STORE register 28 receives the RID that is the subject of the current STORE operation. The LOAD register 30 holds the data (RID) for the entry which has been deemed least recently used. The CLEAR register 32 receives the RID that is the subject of the current CLEAR operation. The STATUS register 34 is flagged to indicate various error conditions. In the illustrative implementation STATUS register 34 has three bits. The first bit is flagged when a STORE operation is executed but no empty entry could be found in the TCAM. The second bit is flagged when there is no valid entry in the TCAM (the value in LOAD register 30 is invalid if this bit is on). The third bit is flagged if the value in ST_CNT register 22 has reached the value in LD_CNT register 24 (alternatively, if the value of the difference there between has reached a threshold). ST_CNT register 22 and LD_CNT register 24 are internal to control unit 12, that is, they do not need to be accessed by the system software.

Updating of the LRU values for related resources occurs every time TCAM 10 is accessed, through STORE or CLEAR operations. In an exemplary store operation, software writes a value of "1111" into STORE register 22 and a value of "FF00" into MASK register 26. Control unit 12 responsively queries TCAM 10 using a search input of xx__11xx__1. TCAM 10 returns a number nn of matching entries. If nn is nonzero, a temporary counter cc is set equal to ss+nn−2, and control unit 12 searches while sequentially decrementing the CNT field by one. In other words, if ss is the current value in ST_CNT register 22, TCAM 10 is searched first for (ss−1)__11xx__1, then (ss−2)__11xx__1, etc., until the number of matches found equals nn. If the DATA field of any matching entry found in this step is equal to the value in STORE register 22 ("1111"), i.e., an exact match for the accessed resource, the CNT field for such entry is set to a new value equal to ss+nn−1, and is written back to TCAM 10. If the DATA field of a matching entry found in this searching is not equal to the value in STORE register 22, the CNT field for such entry is set to a new value equal to cc, and is written back to the TCAM; cc is thereafter decremented. After updating the CNT fields, the sum ss+nn is written to ST_CNT register 22.

This searching can be expressed by pseudo code as follows.

```
ii = 0
ww = ss − 1
cc = ss + nn − 2
loop {
    search ww__11xx__1
    if (match) {
        if (exact match) {
            CNT = ss + nn − 1
            write back to TCAM
        } else {
            CNT = cc
            cc = cc − 1
            ww = ww − 1
            write back to TCAM
        }
        ii = ii + 1
        if (ii == nn) exit loop
    }
}
```

If there are partial matches but no exact match, system 14 must allocate an entry in TCAM 10 for the new resource "1111". Control unit 12 searches for any entry with a valid bit set to zero (an unused entry). If one is found, the new resource is written to that entry with the CNT field set as indicated above (ss+nn−1), and the sum ss+nn is written to ST_CNT register 22. If no entry can be found with V=0, STATUS register 34 is flagged to indicate an error (error bit: line full), indicating a need to evict an entry currently in use. If there are no matches at all (nn=0), system 14 allocates an entry in TCAM 10 for the new resource as just noted, but the CNT field is now set to the current count value (ss), and the sum ss+1 is written to ST_CNT register 22.

Immediately after updating the LRU values of any affected resources in TCAM 10, control unit 12 updates the value in LOAD register 30 to reflect the entry that is now deemed to be the least recently used. If the value in LD_CNT register 24 is rr, control unit 12 searches through TCAM 10 using rr_xxxx__1 as a search key, incrementing rr until a matching entry is found Once a matching entry is found, the value of rr is put into the LD_CNT register, and the value in the DATA field (RID) of the matching entry is put into LOAD register 30. If no matching entry is found when the value of rr has become equal to the value in ST_CNT register 22, STATUS register 34 is flagged to indicate an error (error bit: empty). In this manner, a value corresponding to an LRU entry of TCAM 10 is always in LOAD register 30. Therefore, it is possible for the operating system or other software to obtain the LRU data right away by reading LOAD register 30.

The multi-updating feature can also be utilized for an invalidation operation resulting in a CLEAR operation. In an exemplary CLEAR operation, software writes a value "1122" into CLEAR register 32. Control unit 12 reads the value of "FF00" from MASK register 26, and searches through TCAM 10 using a masked value of xx__11xx__1. The value xx_xxxx__0 is written into all of the matching entries found (invalidation). LD_CNT register 24 and LOAD register 30 are then updated are described above.

Figure 3A:
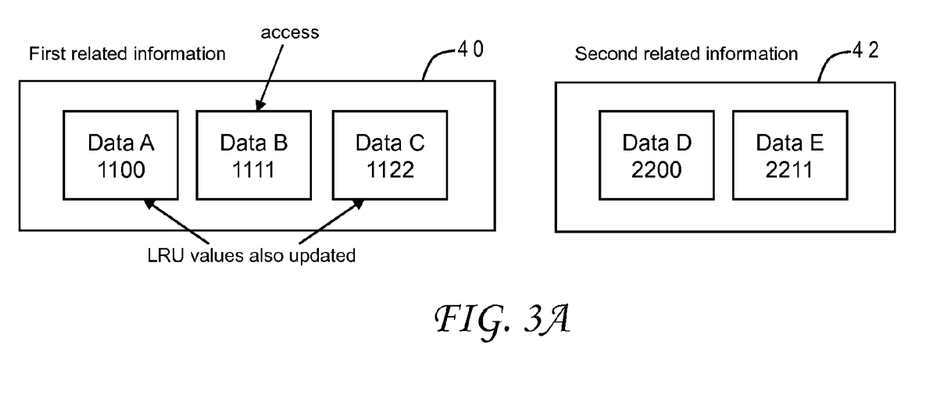
FIGS. 3A and 3B are block diagrams depicting related resources (data for related information and tasks for related users) which can be concurrently updated by the LRU mechanism in accordance with one implementation of the present invention.
Figure 3B:
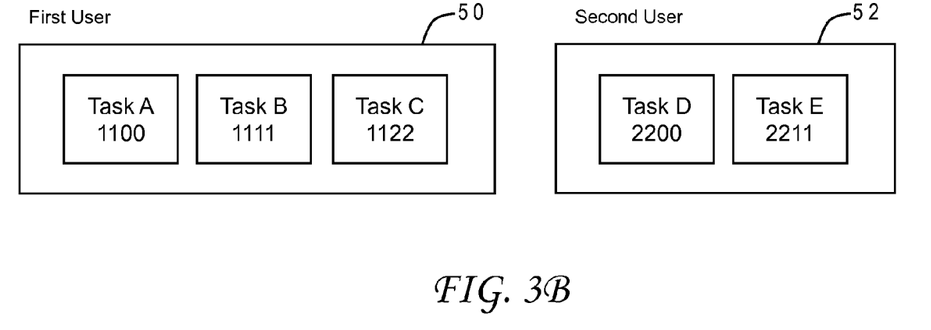

FIGS. 3A and 3B illustrate two applications of the multi-updating feature. In FIG. 3A a program uses five data resources Data A ("1100"), Data B ("1111"), Data C ("1122"), Data D ("2200") and Data E ("2211") in such a manner that there is a high probability that Data A and Data C will be accessed soon if Data B is accessed. Data A, B and C thus constitute first related information which will be assigned appropriate RIDs (in this case, all beginning with "11") to allow mask searching. Similarly, there is a high probability that the Data E will be accessed soon if Data D is accessed. Data D and E thus constitute second related information which will likewise be assigned appropriate RIDs (in this case, both beginning with "22") to allow mask searching. In this example, LRU values of Data A, B and C are increased at the same time when any of them are accessed, and the LRU values of Data D and E are increased at the same time when either of them are accessed.

In FIG. 3B, multiple tasks are running on processing resources of a computer system, including Task A, Task B, Task C, Task D and Task E (with the same respective RIDs as FIG. 3A). Tasks A, B and C belong to a first user, while Tasks D and E belong to a second user. In this example, the goal is to achieve fairness in the allocation of task processing time among a plurality of users. Assuming that Tasks D and E have not been processed for a long period of time, and that Task B has just been executed, from the standpoint of fairness it is better to set either Task D or Task E as the next to be executed rather than Task A or Task C. Accordingly, when Task B is executed, the LRU values for all of Tasks A, B and C should be increased concurrently, to ensure that Tasks D or E will have the smallest LRU value. In this manner, the second user whose tasks have not run recently will be selected for the next task to be executed.

Figure 4A:
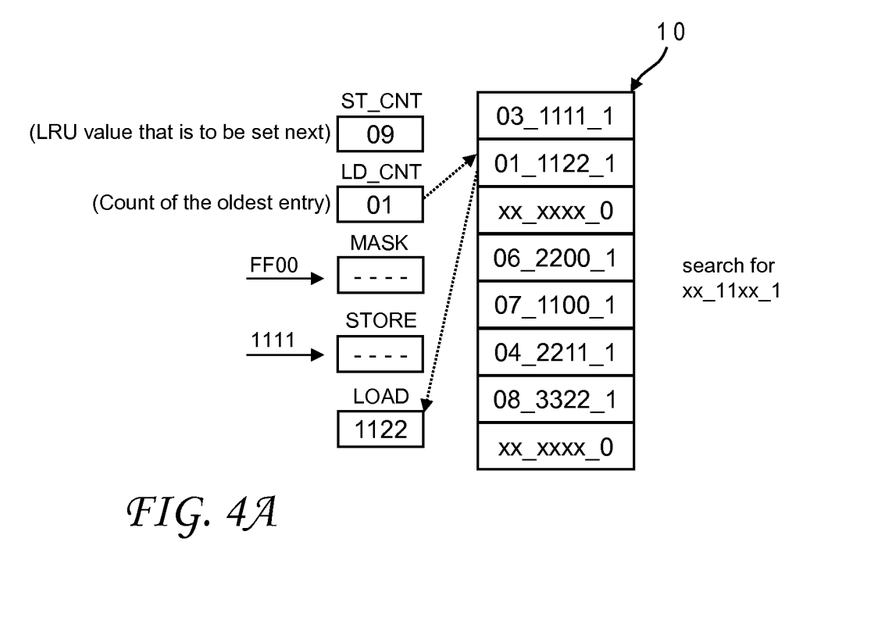
FIGS. 4A and 4B are pictorial representations of LRU update operations in a specific example for the LRU mechanism of FIG. 2.
Figure 4B:
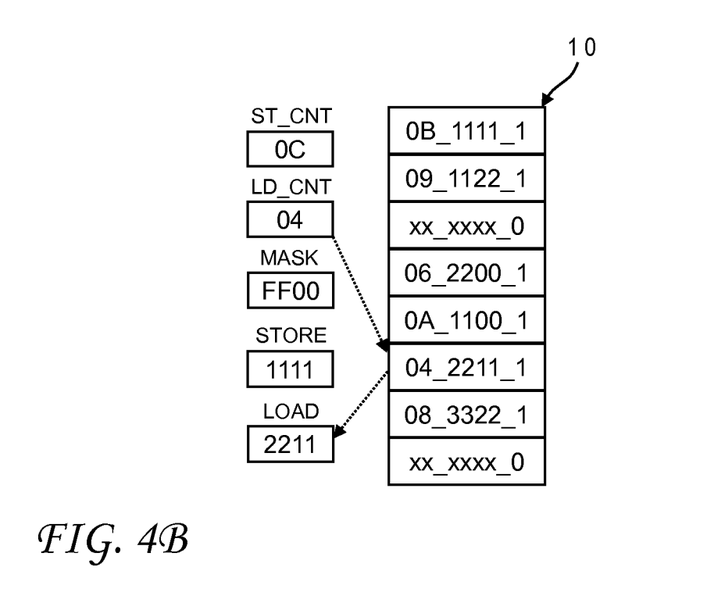

From the viewpoint of the multi-update LRU feature, the operation of the second example in FIG. 3B is completely the same as that of the first example in FIG. 3A, which is now explained with further reference to FIGS. 4A and 4B. FIG. 4A shows an example of the content of registers 20 and TCAM 10 in a state when the current count is 9 (09 in ST_CNT 22). The lowest count for any entry in TCAM 10 is 1 (01 in LD_CNT register 24), corresponding to the second word line (row) of TCAM 10 having a data value of "1122". This data value is accordingly written in LOAD register 30.

While in this state, system 14 receives a store operation from software for data value "1111" (Data/Task B) with a mask value of "FF00". Control unit 12 searches through TCAM 10 using a masked value of xx__11xx__1 for finding entries agreeing therewith. As a result, three entries are found matching this search value, the first, second, and fifth counted from the top: 03__1111__1 (Data/Task B), 01__1122__1 (Data/Task C), and 07__1100__1 (Data/Task A). Control unit 12 will assign count values of 09, 0A and 0B to these three matches, but to do this assignment it must search for the matches in order of LRU values while also looking for an exact match. As explained above, the searching begins with a count value which is one less that the current count, so the first sequential search is for masked value 08__11xx__1, which returns no match. The next search for 07__11xx__1 returns a match with the fifth entry, however the data value of this entry is not "1111". Accordingly, a count value of 0A is assigned (cc=ss+nn−2=9+3−2=10 decimal), so the word line 0A__1100__1 is written into this entry (cc is then decremented to 09). The next three searches for 06__11xx__1, 05__11xx__1 and 04__11xx__1 return no matches. The next search for 03__11xx__1 matches with the first entry, and since the data value of this entry is "1111" (an exact match), a count value of 0B is assigned (ss+nn−1=9+3−1=11 decimal), so the word line 0B__1111__1 is written into this entry. The next search for 02__11xx__1 yields no match. The next search for 01__11xx__1 matches with the second entry, but since the data value of this entry is not "1111", a count value of 09 (cc as already decremented) is assigned, and a word line 09__1122__1 is written into this entry. Control unit 12 recognizes that the three indicated matches have now been found and so terminates the searching. In this way, information on the sequential order of the Data/Task C and the Data/Task A is maintained together with information that the Data/Task B have been recently used.

After updating the LRU values of the related resources in TCAM 10, the LRU registers of control unit 12 are updated. TCAM 10 is searched to check whether there is any entry that has an LRU value that is equal to the current LD_CNT value (01), i.e., a masked input value of 01_xxxx__1. Since there is no entry that satisfies the above condition (the entry 01__1122__1 was updated to 09__1122__1), the search is continued with counts of 02, 03, 04 in this order. As a result, the input 04_xxxx__1 matches with the sixth entry, that is, 04__2211__1. Therefore, this count (04) is written into LD_CNT register 24, and the corresponding RID "2211" is written into LOAD register 30. Finally, ST_CNT register is set to 0C, that is, the maximum current LRU value (0B) plus one.

One limitation of this design is the maximum count that can be achieved using the CNT bits. If for example one group of related information is frequently accessed whereas the other group of related information is rarely accessed, the difference between the maximum LRU value and the minimum LRU value will gradually increase. When the count overflows it wraps back starting at zero again, and the value of ST_CNT can eventually catch up with the value of LD_CNT. To avoid this situation, when the difference between the value of LD_CNT and the value of ST_CNT has become lower than some predetermined threshold value, the software can be informed whereupon it can update or delete an entry that has a small LRU value (for example, either by flagging the STATUS register to indicate an error, or by issuing an interruption request). Alternatively, the control unit can automatically conduct a search on the TCAM sequentially by starting with a large LRU value, and update the LRU values in such a way as to narrow the gap.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with particular application to cache memories, but it is more widely usable in any system relying on LRU or LRU-like optimizations including without limitation embedded systems, data storage and management (access, analysis, delivery), and system software. Also, while the multi-update feature is particularly useful in a perfect LRU implementation, it can also be used in other replacement algorithms, such as pseudo-LRU in which case the pseudo-LRU bits constitute the temporal usage information that is updated. It is therefore contemplated that such modifications can be made without departing from the spirit or scope of the present invention as defined in the appended claims.

What is claimed is:

1. A method of designating a least recently used entry in a content addressable memory which holds data values having respective resource identifiers comprising:
   storing a plurality of the resource identifiers in entries of the content addressable memory with respective count values indicating a time sequence in which the resource identifiers were stored;
   changing selected count values to higher count values in response to access requests for corresponding resource identifiers;
   after each access request, searching the content addressable memory to find one of the entries having a lowest count value, and writing the resource identifier of the entry having the lowest count value to a least recently used register;
   receiving a request to store a new resource identifier in the content addressable memory;
   determining that the new resource identifier is not currently stored in the content addressable memory and that the content addressable memory has no currently unused entries;
   reading the least recently used register to identify the resource identifier therein as a least recently used resource identifier; and
   allocating the entry corresponding to the least recently used resource identifier for storing the new resource identifier.

2. The method of claim 1 wherein:
   the lowest count value is written to a load count register;
   a current count to be assigned to the next resource identifier accessed is written to a store count register; and
   the new resource identifier is written to a store operation register.

3. The method of claim 1 wherein said changing, said searching, and said writing are carried out by a hardware control unit for the content addressable memory, and the least recently used register is part of the hardware control unit.

4. The method of claim 1 wherein the content addressable memory is part of a cache memory and the resource identifiers are memory addresses.

5. The method of claim 1 wherein the content addressable memory is a ternary content addressable memory, and said changing includes:
   receiving a mask value which defines a relationship between certain resource identifiers stored in the entries;
   searching the entries to find a plurality of matches with a resource identifier being accessed based on the mask value, the matches including partial matches which are not exact matches with the resource identifier being accessed; and
   increasing the count values for all entries corresponding to the partial matches.

6. A method of managing a plurality of resource values stored in entries of a ternary content addressable memory comprising:
   storing temporal usage information with the resource values in the entries of the ternary content addressable memory;
   receiving access requests for corresponding resource values, at least one of the access requests having a mask value which defines a relationship between certain resource values stored in the entries;
   searching the entries to find a plurality of matches with a resource value being accessed based on the mask value, the matches including one or more partial matches which are not exact matches with the resource value being accessed; and
   updating the temporal usage information only for entries corresponding to the partial matches and any exact match.

7. The method of claim 6 wherein the temporal usage information includes count values stored with respective resource values, the count values indicating a time sequence in which the resource values were stored, and said updating includes increasing the count values only for entries corresponding to the partial matches and any exact match.

8. The method of claim 7 wherein said increasing preserves an order of the count values for the entries corresponding to the partial matches.

9. The method of claim 7 wherein said searching finds an exact match with the resource value being accessed, and further comprising changing the count value for the entry corresponding to the exact match to an updated count value which is greater than the increased count values of the entries corresponding to the partial matches.

10. The method of claim 9 wherein the updated count value for the entry corresponding to the exact match is equal to ss+nn−1, where ss is a current count to be assigned to the next resource value accessed and nn is a number of the matches.

11. The method of claim 6 further comprising, after each access request, searching the ternary content addressable memory to find one of the entries having a lowest count value, and writing the resource value of the entry having the lowest count value to a least recently used register.

* * * * *